Nov. 6, 1923. 1,472,919
A. M. LANE
AWNING FOR AUTOMOBILES
Filed Feb. 7, 1921     2 Sheets-Sheet 2
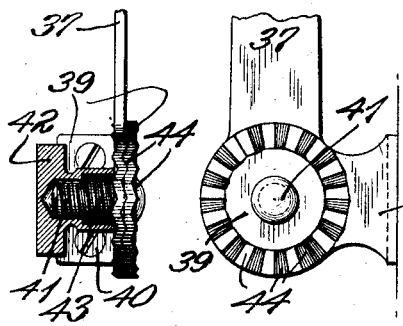
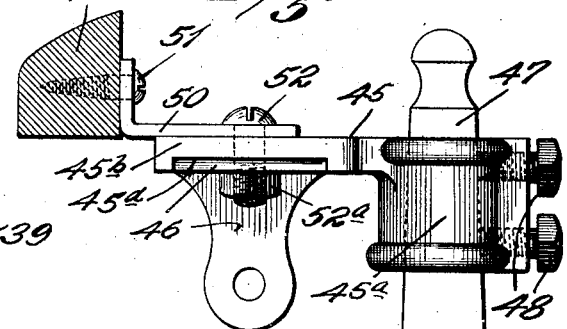
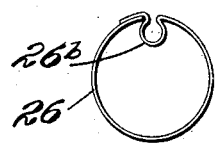
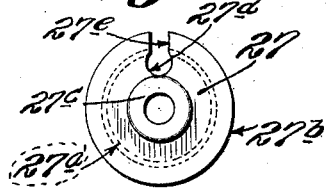
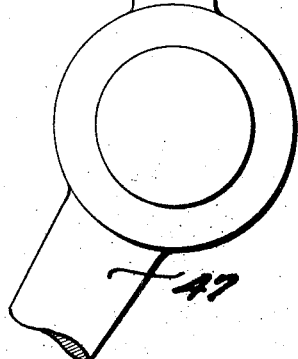
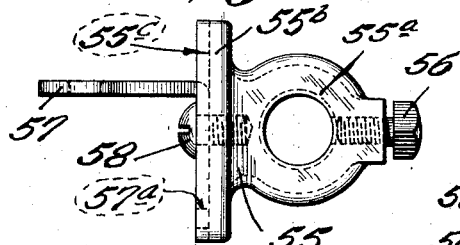
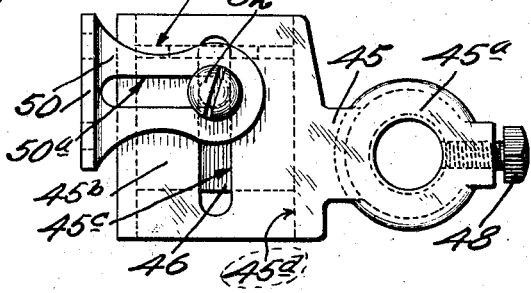
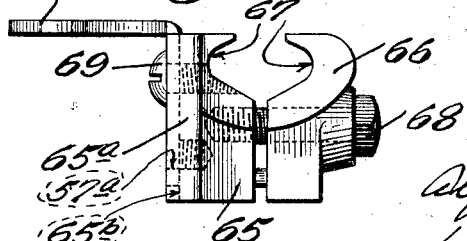

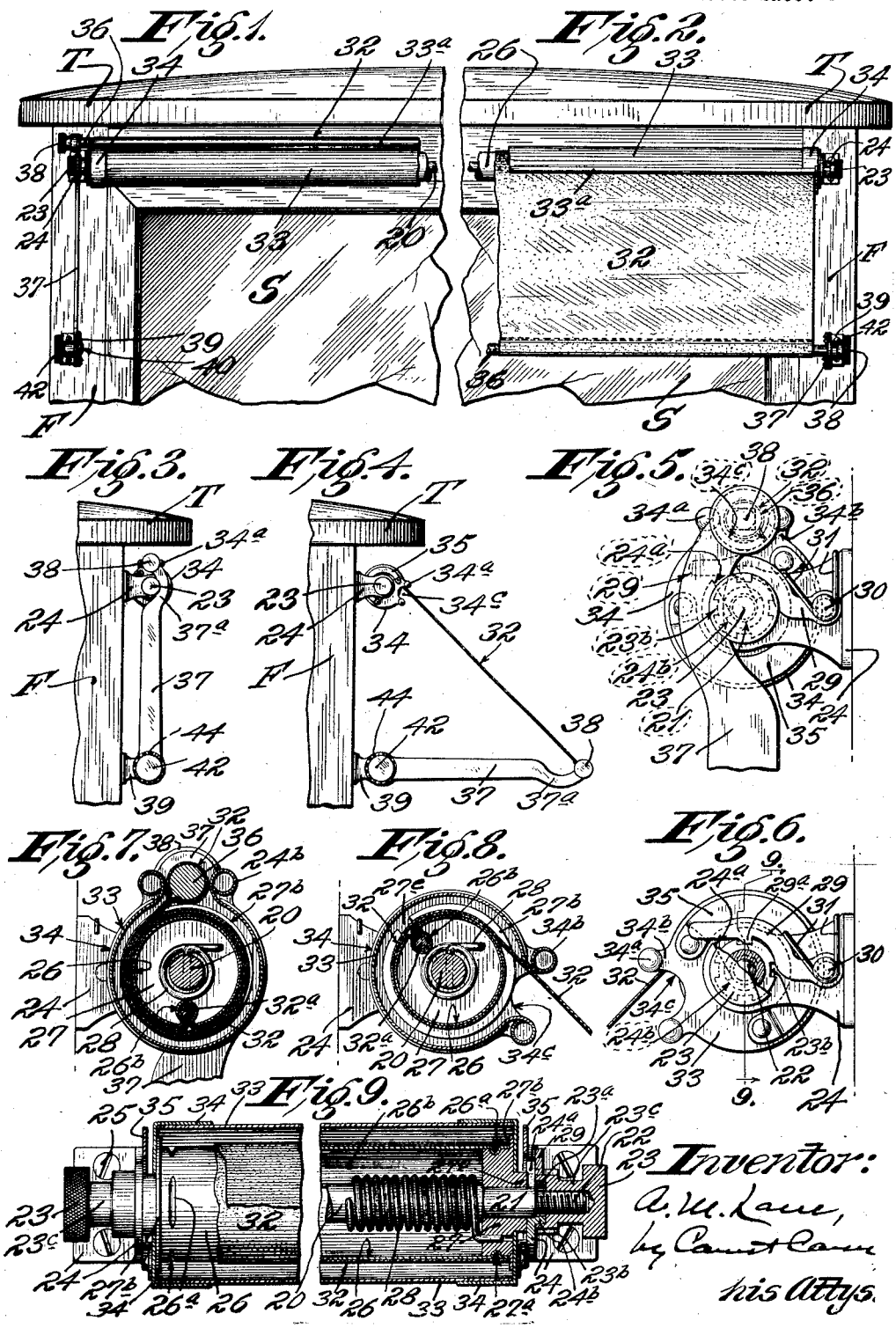

Patented Nov. 6, 1923.

1,472,919

UNITED STATES PATENT OFFICE.

ALFRED M. LANE, OF ST. LOUIS, MISSOURI, ASSIGNOR TO MONARCH METAL PRODUCTS COMPANY, OF ST. LOUIS, MISSOURI, A CORPORATION OF MISSOURI.

AWNING FOR AUTOMOBILES.

Application filed February 7, 1921. Serial No. 443,131.

*To all whom it may concern:*

Be it known that I, ALFRED M. LANE, a citizen of the United States, and a resident of the city of St. Louis and State of Missouri, have invented a new and useful Improvement in Awnings for Automobiles, of which the following is a specification.

This invention relates principally to awnings for use in connection with automobiles and constituting vizors or sunshades for the front thereof.

One of the principal objects of the present invention is an automobile awning of neat and attractive appearance which can be readily attached to automobiles of various makes without altering any portion of such automobiles and which, when attached to the automobile, will not mar its appearance. Another object is to provide means for holding the awning in any desired adjusted position. Another object is to enable the awning to be attached to either open or closed automobiles. Another object is to provide a means for removably securing the fabric covering to the roller of the awning. Other objects are; durability, simplicity, cheapness in manufacture and ease in assembling. The invention consists principally in the automobile awning hereinafter described and in the means for securing said awning in position; and it further consists in combinations and arrangements of parts hereinafter described and claimed.

In the accompanying drawings, which form part of this specification, and wherein like symbols refer to like parts wherever they occur, Fig. 1 is a fragmentary front elevation of one half of the upper portion of a closed automobile-body provided with an awning embodying my invention, the awning being shown in raised position;

Fig. 2 is a similar view showing the opposite half of said body, the awning being shown in lowered position;

Fig. 3 is a fragmentary side elevation of the upper front end of one side of said body, showing the awning in raised position;

Fig. 4 is a similar view, showing the awning in lowered position;

Fig. 5 is an enlarged end elvation of the right hand end of the awning-casing, showing the arm which supports the outer end of the covering in raised position;

Fig. 6 is a view similar to Fig. 5, showing the position assumed by the awning-casing when the awning is lowered;

Fig. 7 is a vertical cross-section through the casing and roller of the awning in the raised position thereof;

Fig. 8 is a similar section through the casing and roller of the awning in the lowered position thereof;

Fig. 9 is a vertical longitudinal section taken through the casing and roller on the line 9—9 in Fig. 6, the left-hand end of the roller being shown in elevation;

Fig. 10 is an edge view of the lower end of the left-hand arm and the bracket which pivotally supports the same, the clamping nut being shown in section;

Fig. 11 is a view looking at the inner faces of said arm and said bracket;

Fig. 12 is an end view of the roller before the end plugs are secured in place;

Fig. 13 is an outside face view of one of the end plugs;

Fig. 14 is fragmentary side view of the upper portion of a wind-shield stanchion of an automobile showing a supporting member for the roller rod bracket;

Fig. 15 is a plan view of said supporting member;

Fig. 16 is a plan view of a modied form of supporting member; and

Fig. 17 is a plan view of another modified form of bracket supporting member.

In Figs. 1 to 4 of the accompanying drawings, my invention is illustrated as applied to a closed automobile-body, which comprises a top T and a front F having a wind shield S pivotally mounted therein to swing vertically.

The awning comprises a cylindrical rod 20 disposed horizontally beneath the overhanging portion of the top T of the automobile, or far enough forward of the top portion of the wind-shield to permit said shield to swing out. The opposite end portions of the rod 20 are reduced adjacent to their ends, as at 21, and said ends are further reduced and threaded, as at 22, for the reception of knurled nuts 23. The reduced end portions 21 of the rod 20 are supported in the outstanding flanges of vertically disposed angle brackets 24, the other flanges of said brackets being secured flat-wise against the front F of the automobile-body by means of screws 25. The reduced portion 21 at the left-hand end of the rod 20 projects through a circular hole in the outstanding flange of the left-hand bracket; and the reduced portion 21 at the right-hand end of the rod 20 rests in a downwardly and inwardly inclined notch 24$^a$ formed in the upper portion of the outstanding flange of said bracket.

A hollow roller 26 surrounds the rod 20. The roller 26 is of larger diameter than the rod 20 and is closed at the opposite ends by means of circular plugs or blocks 27. The blocks 27 have central circular openings extending therethrough, whereby they are adapted to be rotatably supported on the reduced end portions 21 of the rods 20. The cylindrical blocks or end pieces 27 are located between the inner faces of the outstanding flanges of the supporting brackets 24 and the shoulders formed by the reduced portions 21 of said rod. The end pieces are fitted into the ends of the roller 26; and the portions thereof which extend into the roller are provided with annular grooves 27$^a$. The metal of the roller adjacent to the grooves 27$^a$ is pressed into said grooves at the desired points 26$^a$, whereby endwise movement of the roller 26 and end pieces 27 with respect to each other is prevented. The end pieces 27 are provided with annular flanges 27$^b$ of a larger diameter than the outside diameter of the roller 26; and said end pieces are also provided with reduced hub portions 27$^c$ which project outwardly from the outer surfaces thereof.

The rod 20, adjacent to the right-hand end thereof is provided with a coil spring 28. One end of said spring is secured to the rod 20 by passing said end through a hole in said rod; and the other end of said spring is secured to the right-hand end piece by passing said end through a hole in said end piece. The spring is wound by rotating the left-hand end of the rod 20 to the right by means of the nut 23 at the right-hand end of said rod. The spring 28 is prevented from unwinding by means of a pawl 29, which has one end pivotally secured to the outer face of the outstanding flange of the right-hand bracket by means of a pivot stud 30. The opposite end of said pawl overhangs a hollowed out portion 23$^a$ of the right-hand nut and is provided with a beveled lug 29$^a$ adapted to fit in any one of a series of radially spaced notches 23$^b$ formed in the outer surface of the enlarged portion 23$^a$ of said nut. The pawl 29 is held in engagement with the notches 23$^b$ by means of a spring 31. The spring has its middle portion coiled around the pivot 30 and has one end hooked over the upper edge of the outstanding flange of the bracket and has its other end hooked over the upper edge of said pawl.

The outstanding flange of the right-hand bracket 24 is provided with a semi-circular flange 24$^b$, which projects outwardly from the outer face thereof. The flange surrounds the lower portion of the notch 24$^a$ and fits into the hollowed out portion 23$^a$ of the left-hand nut, thereby preventing upward movement of said rod in said notch.

The roller 26 is formed of a strip of sheet metal which is rolled into the form of a cylindrical tube. The adjacent ends are lapped and secured together, as by spot welding. An inwardly projecting hollow bead 26$^b$ is formed in said tube adjacent to its lapped portions. This bead is narrowest at its base and extends from end to end of the roller and forms an undercut groove in the outer surface which is wider at its bottom than at its top. The roller 26 is provided with a covering or curtain 32, comprising a rectangular piece of linen, muslin, or other flexible material. Said covering is adapted to be rolled upon said roller and has one end formed with a loop within which is positioned a cord 32$^a$. This end of the covering 32 is secured to the roller by sliding the looped portion with the cord therein into the groove formed by the bead in said roller. The portions of the end plugs 27 which project into the ends of the roller have their outer surfaces grooved, as at 27$^d$, to accommodate the beaded portion of the roller. The annular flanges 27$^b$ of the end pieces are notched as at 27$^e$, which notches open into the groove 27$^d$, thereby permitting the corded end of the covering to be slipped endwise into the groove in the roller.

The roller 26 is inclosed within a casing 33 comprising a sheet of metal rolled into a hollow elongated body of substantially C-shaped cross-section. The opposite marginal portions of the metal are spaced apart and rolled to form hollow beads 33$^a$. These spaced beads form a slot or throat portion in the wall of the casing through which the free end of the covering operates. The opposite ends of the casing 33 are closed by means of caps 34, whose cylindrical flanges are cut away between the spaced beads of the casing. The end walls of the caps are provided with central circular openings of a diameter corresponding to the diameter of the hub portions 27$^c$ of the end plugs of the roller 26, whereby said hub portions are adapted to enter said openings and rotatably support said casing. The caps 34 are secured to the ends of the casing 33 by means of pins 34$^a$, which pass through lugs 34$^b$ of the caps and extend into the curled portions 33$^a$ of the casing. Rattling or rotation of the casing is prevented by means of curved springs 35 of flat section. The opposite ends of said springs are riveted to the end caps 34 and have their middle portions offset outwardly so as to frictionally engage the inner surfaces of the outstanding flanges of the supporting brackets 24.

The free marginal portion of the covering 32 is formed with a loop, into which is inserted a cylindrical rod 36. The opposite ends of the rod 36 project beyond the side marginal edges of said covering and are supported in the outer ends of arms 37. The rod 36 has square end portions which fit into square holes in the outer ends of the arms 37; and the ends of said rod are threaded to receive knurled nuts 38, which bear against the outer surfaces of said arms. The inner ends of the arms 37 are pivotally secured to the outstanding flanges of vertically disposed brackets 39 whose other flanges are secured to the front F of the body by means of screws 40. The arms 37 are pivotally secured to the brackets 39 by means of pivot bolts 41. These bolts extend through alined holes in the arms and outstanding flanges of the brackets 39 and are threaded at their end to receive hollow knurled nuts 42. These nuts bear against the outer faces of the arms 37 and are hollowed out to accommodate coil springs 43, which are sleeved upon the projecting ends of the pivot bolts 41. These springs bear against the shoulders formed by the enlarged portions of said nuts and prevent said nuts from unscrewing. The contacting faces of the brackets 39 and the arms 37 are formed with a series of radially disposed interfitting V-shaped corrugations 44, whereby the arms are held in the desired position of adjustment. The arms 37 are disposed in alinement with the reduced portions 23$^c$ of the nuts 23 and are bowed outward, as at 37$^a$, to enable the rod 36 to come to rest in vertical alinement with the rod 20 in the raised position of the awning. The bowed portions 37$^a$ of said arms, in the raised position thereof, bear against the reduced portions 23$^c$ of the nuts 23, which serve as stops for the arms. The end caps 34 of the casing are notched, as at 34$^c$, between the lugs 34$^b$ thereof to accommodate the rod 36 in the raised position of the awning.

The hereinbefore described awning is easy to operate and can be readily applied to an automobile without marring its appearance. When lowered, the awning protects the eyes of the driver of the automobile from the rays of the sun or from the glare of lights and also serves to prevent the accumulation of rain and snow on the upper portion of the wind shield. In the raised position of the awning, the roller and covering are concealed by the casing, which also protects these parts from the weather. The corrugations on the contacting surfaces of the arms and brackets therefor enables the awning to be held in the desired adjusted position. When it is desired to raise the awning, it is only necessary to loosen the nuts 42, whereupon the roller is actuated by the spring 28 and causes the covering 32 to roll upon said roller and the arms 37 to swing up into a vertical position. The undercut groove in the roller permits the covering to be readily attached to the roller and detached therefrom.

In applying the awning to the automobiles having open bodies, a fitting 45, such as shown in Fig. 14, is used for supporting each of the roller rod brackets 46. Each fitting of a pair comprises a vertically disposed collar portion 45$^a$ adapted to be fitted over the upper end portion of the wind-shield stanchions 47, and an arm or shelf portion 45$^b$, which projects horizontally therefrom towards the front of the automobile. The collar portion of the fitting 45 is clamped to the wind-shield stanchion 47 at the desired height by means of set-screws 48. The horizontal shelf portion of the fitting 45 is secured to the front bow 49 of a top of the let-down type by means of an angle bracket 50. One flange of said angle bracket is disposed horizontally and rests upon the upper surface of the shelf portion of the bracket supporting member 45. The bracket 50 is arranged with its other flange up and forward, and said flange is secured to the rear piece of the front bow 49 of the top by means of screws 51. The bracket 50 is secured to the shelf portion of the supporting member by means of a bolt 52, which extends downwardly through an elongated slot 50$^a$ in the bracket and an elongated slot 45 in said shelf portion. The slots 50$^a$ and 45$^c$ are disposed at right angles to each other, the slot 50$^a$ extending lengthwise of the car and the slot 45$^c$ crosswise of said car. This arrangement permits the bracket 50$^a$ to be adjusted for tops of different types. The roller rod bracket 46 has one flange disposed horizontally and arranged in a channel 45$^d$ formed in the underside of the projecting arm 45$^b$ of the supporting member 45; and the other flange of said bracket projects downwardly and is provided with a hole for the reception of the roller rod 20. The horizontal flange of the roller rod bracket 46 is provided with a hole for reception of the bolt 52, and said bolt is provided with a nut 52$^a$ for clamping the brackets 46 and 50 in their adjusted positions. With this arrangement, the roller rod brackets 46 are adapted to be adjusted towards and away from each other, whereby one length of roller rod can be used for wind-shield frames of different widths.

Fig. 16 shows a modified form of roller-rod bracket support 55. Said support comprises a vertically disposed collar portion 55ª adapted to be fitted over the wind-shield stanchion 47 and a vertically disposed plate portion 55ᵇ adapted to be positioned in front of the stanchion cross-wise of the automobile. The collar portion 55ª is to be clamped to the stanchion by means of set-screws 56. The roller-rod bracket 57 is disposed with both flanges vertical, one of said flanges being slidably mounted in a horizontally extending channel 55ᶜ formed in the front face of the plate portion of the supporting member. The other of said flanges faces forward and has a hole therein for the reception of the roller-rod 20. The flange of said roller-rod bracket 57 located in the channel 55ᶜ in the plate portion 55ᵇ is secured therein by means of a screw 58, which passes through a horizontal slot 57ª in said flange and is threaded into said supporting member.

Fig. 17 shows another modified form of roller-rod supporting member adapted for use in connection with cars having a windshield stanchion of irregular cross-section. Said supporting member comprises two half-sections 65 and 66 having oppositely disposed vertically grooved portions 67 adapted to straddle the front and back portions of the stanchion. The half-sections 65 and 66 are adapted to be clamped to the stanchions by means of screws 68, which pass through the rear section 66 and are threaded into the front section 65. The front section 65 has a vertically disposed front plate portion 65ª which is channeled horizontally, as at 65ᵇ to receive one of the vertically disposed flanges of the roller-rod bracket 57. The other flange of said bracket projects forwardly and is provided with a hole for the reception of the roller-rod 20. The bracket 57 is secured to the front section 67 by means of a screw 69 which passes through the elongated slot 57ª in said bracket and is threaded into said front half-section.

The hereinbefore described arrangement admits of considerable modification without departing from the invention; therefore, I do not wish to be limited to the exact details of construction shown and described. So, too, while the invention is primarily intended for use in connection with automobiles, it is obviously applicable to other vehicles and structures, and the accompanying claims are to be read accordingly.

What I claim is:

1. An awning for automobiles comprising a roller adapted to be rotatably supported on such automobile, a curtain adapted to be rolled upon said roller, a pair of arms pivotally supported on said automobile on opposite sides of said curtain and having their free ends connected to the free end of said curtain, and a casing enclosing said roller and having a longitudinal throat portion through which the free end of said curtain is drawn, said casing being rotatably supported whereby the throat portion thereof is adapted to follow the angular positions of said curtain when the same is raised and lowered.

2. An awning for automobiles comprising a roller adapted to be rotatably supported on such automobile, a curtain adapted to be rolled upon said roller, said curtain having a rod extending along its free marginal portion and secured thereto, a pair of arms adapted to be pivotally supported on said body on opposite sides of said curtain and having their free ends secured to the opposite ends of said rod, and a casing inclosing said roller and having a longitudinal throat portion through which the free end portion of said curtain operates, said casing being rotatably supported upon said roller so as to permit its throat portion to follow the plane of said curtain when the same is raised and lowered, said throat portion of said casing forming a pocket for the rod at the free end of said curtain in the raised position of said awning.

3. An automobile awning comprising a rod adapted to be supported at its opposite end on an automobile, a hollow roller journaled on said rod and having an undercut groove extending from end to end thereof, a curtain adapted to be rolled upon said roller, said curtain having a thickened upper end portion adapted to be slid endwise into said groove, and a casing inclosing said roller, said casing being journaled on said roller and having a longitudinal throat portion through which the free end of said curtain operates.

4. An awning for automobiles comprising a rod adapted to be supported at its opposite ends in brackets adapted to be secured to such automobile, a hollow roller journaled on said rod between said brackets, a coil spring surrounding said rod and having one end secured thereto and having its opposite end secured to said roller, and nuts on the opposite ends of said rod for turning said rod to wind said spring, said nuts having radially spaced notches in their outer surface, a spring pressed pawl pivotally mounted on a bracket and adapted to engage the notches of a nut, whereby said pawl serves as a lock to prevent said spring from unwinding and to prevent said nut from unscrewing, a curtain adapted to be rolled upon said roller, and hollow casing journaled on said roller between said brackets, said casing having a longitudinally extending throat portion through which said curtain is drawn.

5. An awning for automobiles comprising a spring actuated curtain roller, curtain brackets adapted to be secured to said automobile and rotatably supporting said curtain roller, a curtain adapted to be rolled upon said curtain roller, a casing enclosing said curtain roller and having a longitudinal throat portion through which said curtain operates, said casing being rotatably supported on said curtain roller, and means on said casing and adapted to frictionally engage said curtain brackets for preventing free rotation of said casing.

Signed at St. Louis, Missouri, this 5th day of February, 1921.

ALFRED M. LANE.